C. L. KENNEDY.
AUTOMATIC HOEING MACHINE.
APPLICATION FILED MAR. 10, 1919.

1,336,299.

Patented Apr. 6, 1920.

WITNESSES:

INVENTOR
C. L. Kennedy
BY
Victor J. Evans
ATTORNEY

UNITED STATES PATENT OFFICE.

CHARLES LALOR KENNEDY, OF COLUMBIA, SOUTH CAROLINA.

AUTOMATIC HOEING-MACHINE.

1,336,299.     Specification of Letters Patent.     Patented Apr. 6, 1920.

Application filed March 10, 1919. Serial No. 281,599.

*To all whom it may concern:*

Be it known that I, CHARLES L. KENNEDY, a citizen of the United States, residing at Columbia, in the county of Richland and State of South Carolina, have invented new and useful Improvements in Automatic Hoeing-Machines, of which the following is a specification.

My present invention pertains to means for working cotton, corn and other plants, and hoeing grass after blocking out or spaeing thereof; and it has for its general object the provision of what I denominate an automatic hoeing machine because of its operation being absolutely controlled by the plants that its digger encounters, and also because of its capacity to compensate for the continuous forward progress of the machine by causing the hoe to lag and to subsequently catch up with the remainder of the machine, with a view to affording energy to any plants excepting those that it is desired to cut out or eliminate from a row.

Other objects of the invention will be fully appreciated from the following description and claims when the same are read in connection with the drawings accompanying and forming part of this specification, in which:

Fig. 9 is a perspective provided for the better understanding of the relative arrangement and connections of the working parts of the machine.

Fig. 10 is a perspective illustrative of an electro-mechanical modification hereinafter explicitly referred to.

Fig. 11 is a detail elevation of the right-hand side of the machine.

Fig. 12 is an enlarged detail view showing a portion of the mechanism hereinafter explicitly referred to.

Similar numerals designate corresponding parts in Figs. 1 to 9, and Figs. 10 to 13, to which reference will first be had.

Among other elements my novel machine comprises a main frame having a side bar 1, a side bar 2, a rear transverse bar 3, and a vertically disposed journal bar 4, the latter being preferably arranged in approximately the same longitudinal vertical plane as the frame bar 1. I prefer to employ a main frame such as set forth, and I have specifically described the said frame in order to definitely locate certain parts hereinafter referred to, but it is not to be understood that I confine myself to any specific type of main frame, inasmuch as such frame may be of any construction compatible with the purpose of my invention.

Journaled in the bearing 4 is the turning post 5 of a journal 6 on which is carried a steering wheel 7. The said journal 6 also serving for the connection of a bail 8 provided for the connection of draft animals or other means for the drawing of the machine. The post 5 is provided at 9 with a crank, and to the said crank is connected a rod 10 which is carried to the rear portion of the machine and is there connected to a crank 11 on an upright rockshaft 12, having an angularly disposed handle at 13 whereby an operator is enabled to guide or steer the machine with facility.

At this point I would have it understood that without affecting my invention plows, cultivator shovels and other ground-working implements may be carried by the main frame in addition to the elements comprised in my invention. These plows, cultivator shovels or analogous devices I have, however, deemed it unnecessary to illustrate.

Journaled in the rear portions of the frame bars 1 and 2 is a transverse shaft 14 upon which the left hand ground wheel 15 is loosely mounted. I also employ a right hand ground and driving wheel 16, and this latter is preferably fixed with respect to the shaft 14 and has fixed to its inner side an actuating wheel 17 which is preferably provided with spur gear teeth on the perimeter and with ratchet teeth in circular series on its inner side, see Fig. 9. The spur gear teeth of the actuating wheel 17 are provided for intermeshing the said wheel with a pinion 18 on a transverse shaft 19 that is equipped with a balance wheel 20, having for its function to render steady and even the rotation of the actuating wheel 17 and the parts that derive motion from the same. The shaft 19 is journaled in standards 21 and 22 which are fixed to and rise from the frame bars 1 and 2, respectively.

Figures 3, 4, 5, 6:
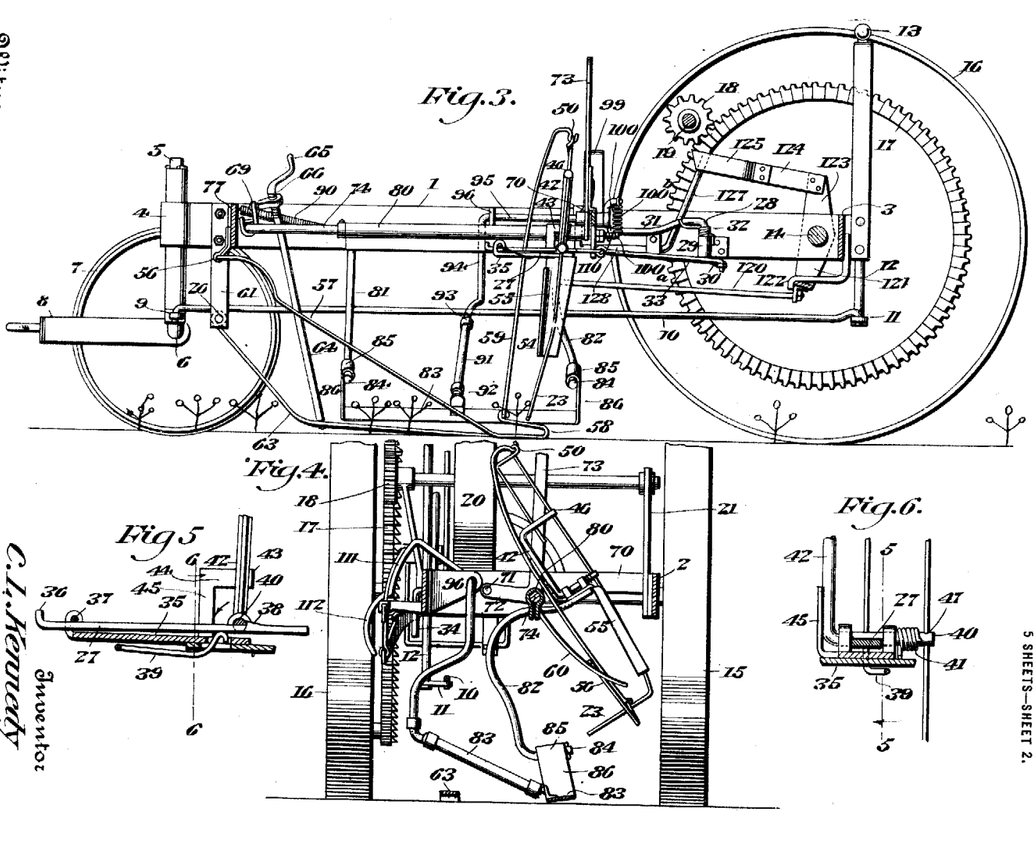
Fig. 3 is a longitudinal vertical section of the machine.
Fig. 4 is a transverse section in the same plane as Fig. 2, but with the working parts in different positions.
Fig. 5 is an enlarged detail longitudinal vertical section taken in the plane indicated by the line 5—5 on Fig. 1 and also on Fig. 6.
Fig. 6 is a transverse section taken in the plane indicated by the line 6—6 of Fig. 5, looking rearwardly.
Figure 7:
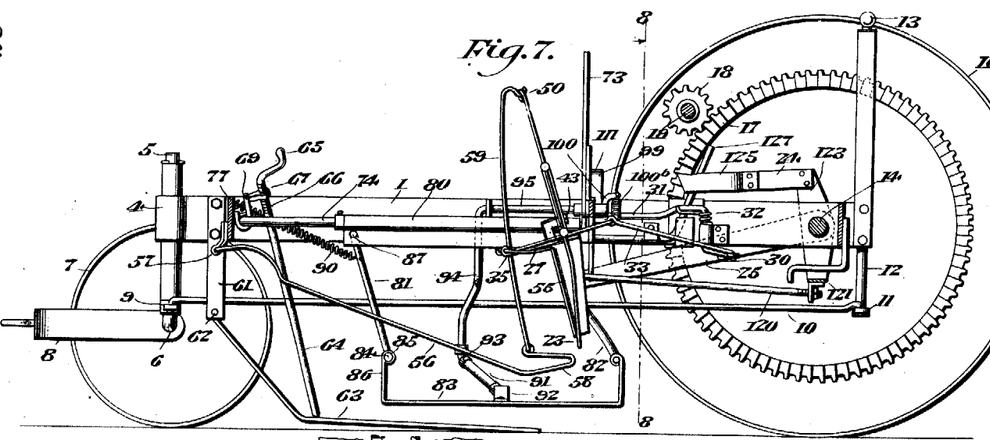
Fig. 7 is a longitudinal vertical section with the working parts differently positioned from Fig. 3.
Figure 8:
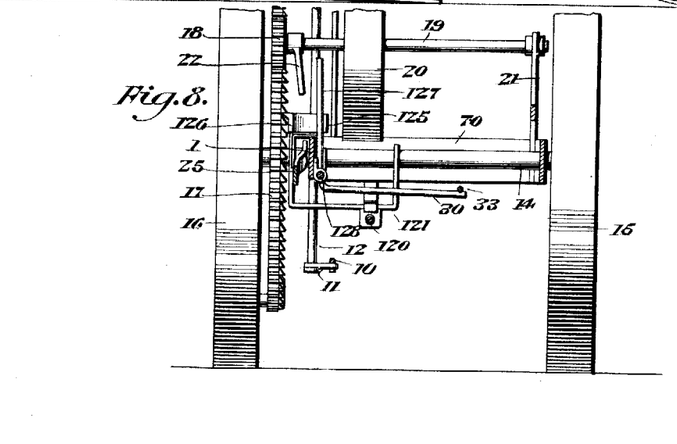
Fig. 8 is a transverse section taken in the plane indicated by the line 8—8 of Fig. 7, looking rearwardly.

A highly important element of my invention is the trigger 23 which is designed to encounter and to be actuated by plants at intervals in its path, so that all of the plants intermediate of those that actuate the trigger will be cut or hoed out in the manner hereinafter fully set forth. Rearward movement of the said trigger 23 is utilized to put into engagement with the ratchet teeth of the actuating wheel 17 the detent 24 of a certain horizontally movable lever 25, which lever 25 is normally held out of engagement with said ratchet teeth by the pressure of a spring 26 which is connected to the frame bar 1 and exerts inward pressure against the forward arm of the lever 25. Said lever 25 is free to swing in a vertical plane on the shaft 14, and after the lever is moved downwardly with the actuating wheel 17, it is automatically released and is caused to return to the position shown in Fig. 9, by means hereinafter described, and when it is so returned it will be subjected to the action of the spring 26 which will hold its detent 24 away from the ratchet teeth of the wheel 17. For the sake of convenience I will first describe the means whereby rearward movement of the trigger 23 under the action of a plant encountered will put the lever 25 into engagement with the ratchet teeth of the wheel 17. The said means comprises a longitudinally disposed latch bar 27, Figs. 5, 6 and 9, a vertical rock-shaft 28 journaled in a bearing 29 on the frame bar 1 and having arms 30 and 31, Fig. 9, a spring 32 that tends to press the arm 31 outwardly, a link rod 33 interposed between and connecting the rear end of the latch bar 27 and the arm 30, and a vertically disposed portion 34 carried on the arm 31 and opposed to the inner side of the lever 25. Manifestly when the latch bar 27 is released and permitted to move forwardly as presently described, the spring 28 through the medium of the arm 31 and its portion 34 will press the lever 25 outwardly so as to put the detent 24 into engagement with one of the ratchet teeth of the actuating wheel 17. As best shown in Figs. 5 and 6, the latch bar 27 has a limited vertical movement above a platform 35, and is provided at its forward end with an upwardly directed portion 36 adapted to bring up against a stop 37 on platform 35 to limit the rearward movement of the latch bar 27 when the latch is automatically raised by the retraction of the rod 33, as hereinafter described. The said latch bar 27 is also provided with a beveled shoulder 38. Said latch bar 27 is pressed upwardly by the terminal of a spring arm 39, which arm 39 is preferably, though not necessarily, a portion of the stop 37. Arranged transversely above the latch bar 27 is a rocking latch bar 40, the portion of which above and in the same vertical plane as the bar 27 is of semi-circular form in cross-section. Said rock-shaft 40 is yieldingly maintained in and returned to the position shown in Fig. 5 by a spring 41, Fig. 6, and said rock-shaft 40 at its inner end merges into an upstanding arm 42 which is adapted when moved rearwardly to bring up against and be limited in its rearward movement by an inwardly extending stop 43 on an arm 44 that extends rearwardly from a standard 45 on the platform 35. At its upper end, the arm 42 merges into an outwardly directed lateral head 46, Figs. 2, 4 and 9. The trigger 23 has an inwardly directed and lowermost transverse portion and also has an upwardly extending rod. This rod is disposed and adapted to play vertically through alined apertures 47 and 48 in the latch member 40 and the head 46, respectively. From this it follows that at all times the upstanding rod or trigger 23 is capable of being moved endwise through the latch member 40 and the head 46 for an important purpose presently set forth. As shown in Fig. 5, the latch is set, and the detent 24 of lever 25 is out of engagement with the ratchet teeth of the wheel 17 which is rotated as the machine progresses. When the lowermost transverse portion of the trigger 23 is moved rearwardly by a plant encountered, the rocking latch member 40 will be rocked in the direction indicated by arrow in Fig. 5, and consequently the latch bar 27 will be released and permitted to move forwardly under the action of the spring 32 which at the same time will throw the arm 31 and the portion 34 thereof outwardly, and by so doing will engage the lever 25 with one of the ratchet teeth of the wheel 17. Immediately after the release and forward movement of the latch bar 27, the spring 41 will return the trigger 23 to its normal position, so that the latch member 40 will be seated to the position shown in Fig. 5, and hence when the latch bar 27 is drawn rearwardly at the time and in the manner hereinafter set forth, the member 40 will automatically reengage the beveled shoulder 38 for a subsequent operation of the trigger.

The upwardly extending rod of the trigger 23 merges at a point above the head 46 in the loop 50, and the said loop 50 merges, in turn, into an inwardly directed arm 51 on which is a depending rod 52 which, by its disposition in an aperture 53 of the head 46, is adapted to prevent turning of the trigger 23 about the axis thereof. There is a depending arm 54 on the platform 35, and on said arm 54 is an outwardly directed flange 55 which serves as a fender or guard for the upwardly extending rod of the trigger 23.

The vertically movable capacity of the trigger 23 permits of the said trigger being raised clear of stones and other fixed obstructions in its path, and for so raising the trigger I provide the vertically swinging fender 56. This fender is pivoted at 57 to the main frame, is provided with the portion 58 below the transverse portion of the trigger 23, and is connected with the loop 50 through the medium of a rod 59. When during the forward movement of the machine the fender 56 is engaged by a stone or other substantially fixed obstruction in its path, the fender will be raised by the stone and will ride over the same. When the fender is raised, the trigger 23 will be raised through the rod 59, and when the fender 56 passes clear of the stone, the fender will drop to its normal working position and at the same time the trigger 23 will gravitate to its normal working position with its transverse lowermost portion slightly above but not in contact with the fender portion 58. The normal working positions of the fender 56 and the trigger 23 are determined by a stop arm 60, Fig. 1, hereinafter adverted to in connection with the description of another part of my invention. On its downward movement, the fender 56 brings up against the said stop 60.

At 61 on the forward portion of the main frame is a hanger, and pivoted at 62 to the said hanger is a vertically adjustable trailing shoe 63, the function of which is to regulate the height at which the hoe, hereinafter described, works. Connected in a swiveled manner to the shoe 63 is a shaft 64 having a crank handle 65 and also having a threaded portion 66 bearing in a member 67, having a shank 68, journaled in a U-shaped bearing 69, the support of which will also be hereinafter set forth. Manifestly through the medium of the shaft 64 the shoe 63 may be expeditiously and easily adjusted vertically and adjustably fixed.

Figures 1, 2:
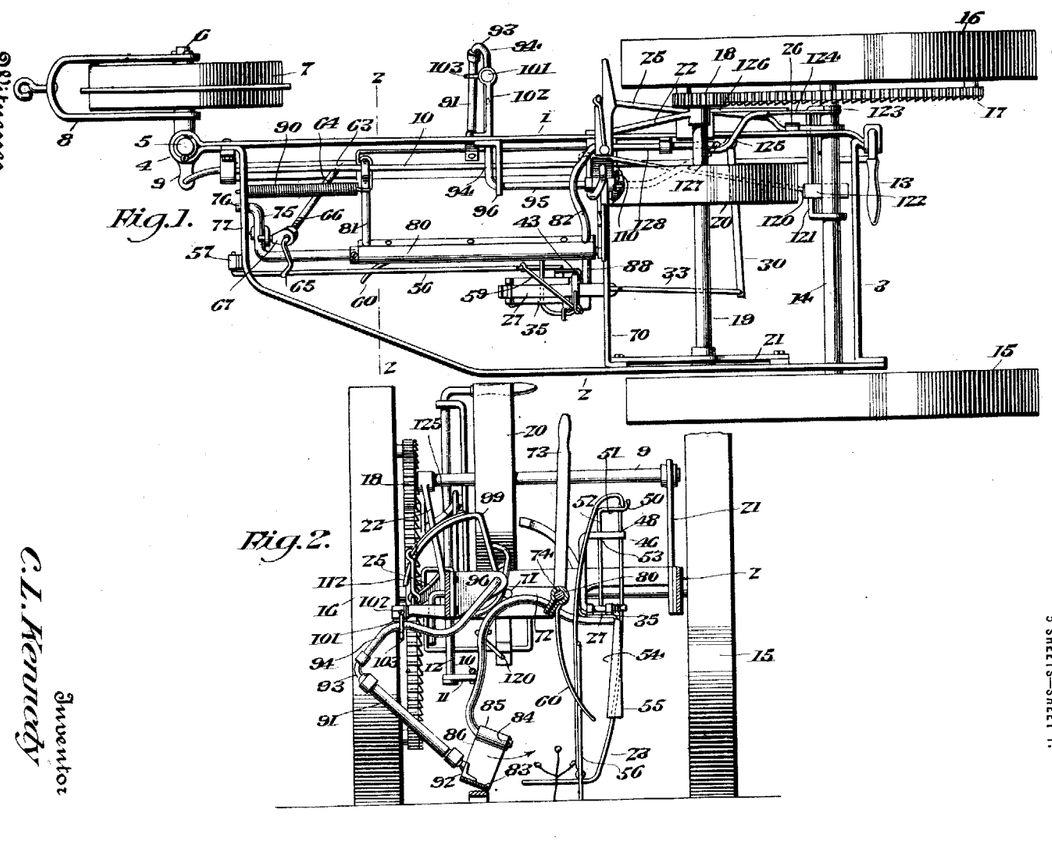
Figure 1 is a plan of the machine constituting the best practical embodiment of my invention that I have as yet devised.
Fig. 2 is a transverse section taken in the plane indicated by the line 2—2 of Fig. 1, looking rearwardly.
Figure 2:
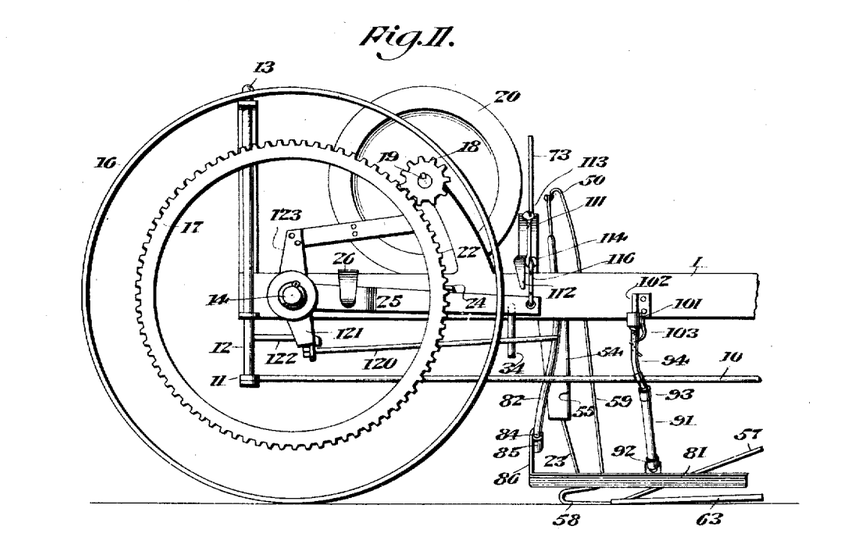

At 70 is a cross-bar interposed between and fixed to the side bars 1 and 2 of the main frame, and at 71, Figs. 2 and 4, is the point at which is pivotally connected the said bar 70 to lower angularly disposed arm 72 of an upright transversely swinging hand lever 73. Carried by the said lever 73 adjacent to the apex of the angle thereof is a longitudinal supporting rod 74, the forward end of which is cranked at 75 and has the end of the said crank 75 journaled at 76 in the forward transverse portion 77 of the main frame. The U-shaped member 69 before referred to is pivotally connected to the said crank 75. Straddling and supported by the rod 74 is a saddle 80 by which is carried the stop arm 60 before referred to.

81 and 82 are longitudinally swinging arms on the lower portion of which is carried the hoe or hoe blade 83; the said arms 81 and 82 having angularly disposed journals 84 arranged in bearings 85 at the upper ends of arms 86 on the ends of the hoe 83. At their upper ends the arms 81 and 82 have transverse journal portions 78 and 88, respectively. These journal portions 87 and 88 bear transversely in the depending portion or skirt of the saddle 80, and the journal 88 is extended to the left from the saddle 80 and serves to carry the before described platform 35 that is complementary to the latch mechanism best shown in Figs. 5 and 6. I would also have it clearly understood at this point that the saddle 80 is free to rock on the supporting rod 74, and that the hoe 83 and its arms 81 and 82 are adapted to participate in said movement. I would also have it understood that coincident with the movement of the hoe 83 in the direction indicated by arrow in Figs. 2 and 4, the swinging movement of the platform 35 with the saddle or transversely rocking member 80 will have the effect of retracting or moving rearwardly the latch bar 27 so as to seat automatically the latching mechanism. Because of the journals 87 and 88, the hoe 83 and the arms 81 and 82 are adapted to be swung on the saddle or rocking member 80 in the direction of the length of the machine. Said parts are so swung against the action of a retractile spring 90 which is connected at its rear end to the forward arm 81, and at its forward end to the forward transverse frame portion 77. When the hoe 83 and the arms 81 and 82 are released subsequently to the said rearward movement thereof, the spring 90 operates to quickly move the hoe 83 and the arms 81 and 82 forwardly to their normal positions, shown clearly in Fig. 1.

I will now describe the means for swinging the hoe 83 and the arms 81 and 82 inwardly and transversely of the machine; it being understood that the saddle 80 and the platform 35 partake of both the inward and outward movements of said hoe 83 and arms 81 and 82. The means referred to comprises a rod 91 connected through a ball and socket joint 92 with the hoe 83, and through a ball and socket joint 93 with a crank arm 94 on a longitudinally disposed rock-shaft 95, journaled in the cross-bar 70 and also in a journal bracket 96 provided on the frame arm 1, Fig. 3. The parts just described are normally maintained in the positions shown in Fig. 2, and so that the crank arm 94 bears against a cushion 101, carried by a bracket arm 102 that extends laterally outward from the frame bar 1. The said bracket arm 102 also carries a keeper 103, Figs. 1 and 2, which is designed to yieldingly hold the crank arm 94 against the cushion 101. Fixed on the rock-shaft 95, slightly in front of the cross-bar 70 is a stop arm 97, and loose on the said rock-shaft 95 and straddling the frame bar 70 is a transversely swinging cam member 99, on which is a crank arm 100, between which and a rearward projection 100$^a$ on the bar 70 is a retractile spring 100$^b$ the function of which is to yieldingly draw the cam member 99 inward and away from the said stop arm 97. The said crank arm 100 has a depending portion 110 which on transverse outward movement of the cam member 99 is adapted to press the arm 31 inwardly and thereby draw the rod 33 rearwardly and bring about the rearward movement of the latch bar 27 and the automatic resetting of the latch. The cam member 99 is provided with an outwardly and downwardly curved arm 111, at the lower end of which is an outwardly directed curvilinear finger 112. Connected at 113 to the upper and inner portion of the arm 111 at the outer side thereof, is a link 114 which extends alongside the front edge of the finger 112 and is connected below the ends 115 of the arm 111 in a loose manner to a link 116 which, in turn, is loosely connected to the forward end of the lever 25 complementary to the ratchet teeth of the actuating wheel 17. By virtue of this construction it will be manifest that when the trigger 23 encounters a plant and is moved rearwardly thereby, and the latch bar 27 is released and moved forwardly, and the lever 25 is moved by the spring 32 and the arm 31 into engagement with the ratchet teeth of the actuating wheel 17, the said lever 25 will be carried downwardly by the wheel 17. On such downward movement of the lever 25 the cam member 99 will be moved outwardly and downwardly, and said cam member 99 engaging the arm on the rock-shaft 95 will rock the said shaft 95 anti-clockwise, and thereby move the arms 81 and 82 and the hoe 83 inwardly. Such movement of the arms 81 and 82 and the hoe 83 will continue until the finger 112 presses forwardly against the outer side of the forward extremity of the lever 25, when said finger 112 will press the lever 25 inwardly sufficiently to disengage the detent 24 from the ratchet teeth of the actuating wheel 17. The described outward and downward movement of the cam member 99 will manifestly expand or put under tension the spring 100$^b$ and hence following the disengagement of the lever 25 from the ratchet teeth of the actuating wheel 17, the spring 100$^b$ will operate to quickly return the cam member 99, the lever 25, the hoe 83 and the arms 81 and 82 to their normal positions shown in Figs. 1 and 2. During said operation the latch bar 27 is retracted and engaged by the latch member 40, and hence when the rear portion of lever 25 comes into engagement with the spring 26, the said spring will operate to hold the detent 24 of the lever 25 out of engagement with the ratchet teeth 17.

Figures 9, 10:
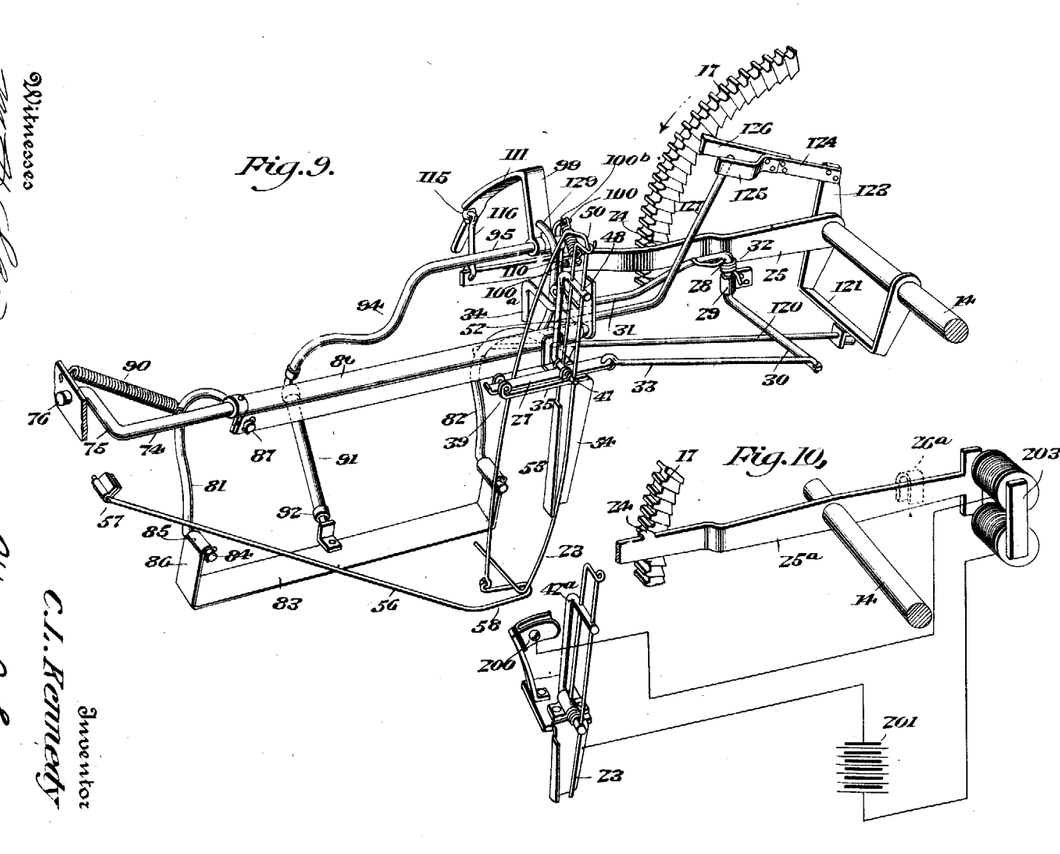
Figure 12:
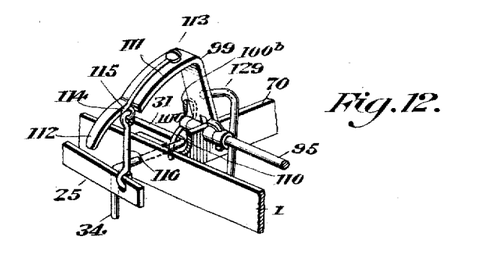

Coincident with the inward movement of the hoe 83, the arms 81 and 82 will be swung rearwardly on the saddle 80, in order to carry the hoe 83 rearwardly and thereby compensate for the forward progress of the machine, and subsequent to the transverse retraction of the hoe 83, the hoe will be quickly drawn forwardly by the spring 90 so as to catch up with the remainder of the machine and be in a position for the succeeding cutting out operation. The hoe 83 and the arms 81 and 82 are moved rearwardly in the manner and at the time stated through the medium of an organized mechanism which is at once simple and highly efficient. The said organized mechanism comprises a rod 120 connected to and extending rearwardly from the rear arm 82, Figs. 3, 7 and 9, a vertically swinging lever 121 fulcrumed on the shaft 14 and having below the shaft a bail-shaped portion adapted to bring up against a stop 122 on the rear frame bar 3, and also having an upwardly extending arm 123; the bail-shaped portion of said lever 121 being connected to the rear end of the rod 120 in such manner that the rod 120 is free to move rearwardly independently of the lever, a spring strip 124 extending forwardly from the arm 123 of lever 121, an arm 125, Figs. 1 and 3, carried by the free portion of the strip 124, and a detent-carrying arm 126 spaced from the arm 125 and also carried by said strip 124, the detent of said arm 126 being adapted to engage the before-mentioned ratchet teeth of the actuating wheel 17 under certain conditions hereinafter set forth. Extending upwardly and at the outer side of the cam arm 125 is an arm 127 on a horizontal rock-shaft 128, which shaft 128 is provided at its forward end, and as best shown in Figs. 1, 2 and 9, with an upwardly extending arm 129 which is opposed to the inner side of the cam member 99. Normally the spring strip 124 tends to move the arm 126 outwardly so as to carry the detent on said arm into engagement with the ratchet teeth of the wheel 17. This, however, is normally prevented by the arm 127. When, however, the cam member 99 is moved transversely outward in the manner before described, the spring strip 124 moves the arm 126 laterally outward and into engagement with the ratchet teeth of the wheel 17. In consequence of this the lever 121 is swung by the movement of the wheel 17 so as to throw the bail-shaped portion of said lever 121 rearwardly, and with it the rod 120, the arms 81, 82 and the hoe 83. Thus the retraction or rearward movement of the hoe is brought about. Then when the quick inward movement of the cam member 99 takes place, the said cam member 99, by engaging the arm 129, quickly moves the arm 127 and the arm 125 inwardly to disengage the detent arm 126 from the ratchet teeth of the wheel 17, whereupon the spring 90 will operate to withdraw arm 81, the hoe 83 and the arm 82 forwardly, in the manner and for the purpose before described.

Figure 13:
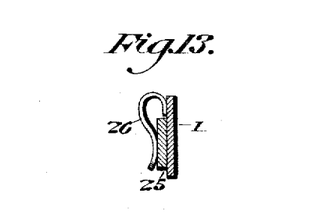
Fig. 13 is an enlarged detail transverse section showing the spring for holding the main lever normally out of engagement with the ratchet teeth of the actuating wheel.

In Fig. 13 I illustrate electro-mechanical means whereby when the trigger 23 is moved rearwardly by a plant encountered, a lever 25$^a$ corresponding to the before-mentioned lever 25 and having a detent 24, will be put into engagement with the actuating wheel 17. This will be understood when it is stated that the described rearward movement of the trigger 23 will be attended by forward movement of the upright 42$^a$ which will put the said upright 42$^a$ in electrical contact with a terminal 200, arranged in a normally open circuit inclosing a source of electric energy 201, the upright 42$^a$ and electro-magnets 203. The said electro-magnets are opposed to the rear arm of the lever 25$^a$, and hence when the circuit is closed by the operation of the trigger 23, the rear arm of the lever 25$^a$ will be drawn inwardly and the forward arm of the said lever will be thrown outwardly and into engagement with the ratchet teeth of the actuating wheel 17. After the trigger 23 is released by the plant which actuated it, the said trigger will resume its normal upright position, and by so doing will break the electrical contact, whereupon a suitable spring 26$^a$ will operate to disengage the detent of the lever 25$^a$ from the ratchet teeth of the actuating wheel.

The operation of my automatic hoeing machine will, it is believed, be clear from the foregoing, when it is remembered that the machine is possessed of the capacity of cutting out or eliminating plants in the intervals between those plants which by engaging the trigger 23 are utilized to put the cutting out mechanism in operation. From this it follows that it is necessary as a condition precedent to the operation of the cutting out mechanism for the trigger 23 to encounter and to be moved by a plant.

Having described my invention, what I claim and desire to secure by Letters-Patent, is:

1. The combination of a wheeled frame, hoeing means carried thereby, actuating means for the hoeing means, a trigger for putting said actuating means in operation; said trigger being constructed and arranged to encounter and be actuated by a plant, means for resetting the actuating means and the trigger subsequently to an operation of the latter, and a fender complementary to the trigger.

2. The combination of a wheeled frame, hoeing means carried thereby, actuating means for the hoeing means, a trigger for putting said actuating means in operation; said trigger being constructed and arranged to encounter and be actuated by a plant, means for resetting the actuating means and the trigger subsequently to an operation of the latter, and a fender complementary to the trigger; the said fender being disposed under the trigger, and the trigger and fender being movable vertically by an obstruction encountered by the fender.

3. The combination of a wheeled frame, hoeing means carried thereby, actuating means for the hoeing means, a trigger for putting said actuating means in operation; said trigger being constructed and arranged to encounter and be actuated by a plant, means for resetting the actuating means and the trigger subsequently to an operation of the latter, and a fender complementary to the trigger; the fender being disposed under the trigger and movable vertically and being connected with the trigger whereby up and down movements of the fender will be attended by corresponding movements of the trigger.

4. The combination of a wheeled frame, hoeing means carried thereby, actuating means for the hoeing means, a trigger for putting said actuating means in operation; said trigger being constructed and arranged to encounter and be actuated by a plant, means for resetting the actuating means and the trigger subsequently to an operation of the latter, and a fender complementary to the trigger; the fender being disposed under the trigger and movable vertically and being connected with the trigger whereby up and down movements of the fender will be attended by corresponding movements of the trigger, and the connection between trigger and fender being so constructed and arranged that the trigger is capable of moving rearwardly and forwardly.

5. The combination of a wheeled frame, a vertically swinging trailing fender connected to the frame and having a rear ground-engaging portion, a trigger disposed above said ground-engaging portion and mounted to swing rearwardly and forwardly and to move up and down, and a connection intermediate said ground-engaging portion and the upper portion of the trigger and arranged to permit said swinging movements of the trigger independently of the fender.

6. The combination of a carrying means, a yieldingly-pressed latch bar thereon, a rocking latch member complementary to the latch bar, a trigger movable endwise in the rocking latch member and arranged to swing with said member, and yielding means for holding the rocking latch member and the trigger in normal position and returning the same to said position.

7. The combination of a carrying means, a spring-pressed latch bar, a rocking latch member complementary to said bar, an arm on the rocking latch member and having an apertured head disposed above said member, a trigger movable endwise in the rocking member and the head and adapted to swing therewith, a vertically swinging fender complementary to the trigger, and a connection intermediate said fender and the upper portion of the trigger.

8. The combination of carrying means, a platform having a forward stop portion, a longitudinally movable latch bar on the platform and having a beveled shoulder and also having on its forward portion an abutment to bring up against said stop portion, means for yieldingly pressing the latch bar upwardly, a rocking latch member having a semicircular portion opposed to the upper side of the latch bar and also having an upwardly extending arm and an apertured head on the same and above the rocking member, a trigger arranged to swing with said rocking member and head and move endwise through the same, and yielding means for retaining the rocking member and the head and the trigger in and returning the same to their normal positions.

9. The combination of carrying means, a platform having a forward stop portion, a longitudinally movable latch bar on the platform and having a beveled shoulder and also having on its forward portion an abutment to bring up against said stop portion, means for yieldingly pressing the latch bar upwardly, a rocking latch member having a semi-circular portion opposed to the upper side of the latch bar and also having an upwardly extending arm and an apertured head on the same and above the rocking member, a trigger arranged to swing with said rocking member and head and move endwise through the same, yielding means for retaining the rocking member and the head and the trigger in and returning the same to their normal positions, and a vertically swinging and trailing fender connected with the carrying means and having a portion disposed below the trigger and loosely connected with the upper portion of the trigger.

10. The combination of a wheeled frame, a transversely movable hoe, a trailing regulating shoe pivoted to the frame, a threaded bearing connected with the frame, and an adjusting shaft threaded through said bearing and connected in swiveled manner to the shoe.

11. The combination of a wheeled frame, an adjustable and trailing regulating shoe carried thereby, means for adjustably fixing said shoe, a longitudinally disposed cranked support also carried by the frame, and a transversely swinging and longitudinally disposed hoe mounted on said support.

12. The combination of a wheeled frame, a transversely and forwardly and rearwardly swinging hoe carried thereby, means for swinging the hoe inwardly and outwardly, a retractile spring for swinging the hoe forwardly, and means for swinging the hoe rearwardly against the action of said spring.

13. The combination of a wheeled frame, a longitudinal support therein, a saddle mounted to swing on said support, a transversely and longitudinally swinging hoe, connecting arms journaled in the saddle and the hoe, and means for moving the hoe inwardly, outwardly, rearwardly and forwardly.

14. The combination of a wheeled frame, a longitudinal, cranked support therein, a saddle arranged to swing transversely on said support, a hoe, connecting arms journaled in the saddle and the hoe whereby the hoe is movable rearwardly and forwardly, and a retractile spring interposed between the forward arm and the frame for swinging the hoe forwardly.

15. The combination of a wheeled frame, a longitudinal, cranked support therein, a saddle arranged to swing transversely on said support, a hoe, connecting arms journaled in the saddle and the hoe whereby the hoe is movable rearwardly and forwardly, a retractile spring interposed between the forward arm and the frame, a platform carried by one of the arms, a trigger, latching mechanism complementary to the trigger and carried on said platform, means put into operation by the trigger for actuating the hoe, and means whereby the trigger and said actuating means are reset subsequently to an operation of the trigger.

16. The combination of a frame, a toothed actuating wheel, a lever movable into and out of engagement with the teeth of said wheel, means actuatable by movement of the lever with the wheel, a trigger, means controlled by the trigger for putting the lever into engagement with the actuating wheel, and means for resetting the trigger and the trigger-controlled means and the means actuatable by movement of the lever with the wheel subsequently to an operation of the actuated means.

17. The combination of a frame, a toothed actuating wheel, a lever movable into and out of engagement with said wheel, a trigger; means controlled by the trigger for engaging said lever with the wheel, mechanism actuated by movement of the lever with the wheel, and means whereby the trigger and the lever are automatically reset incidental to operation of the said actuated mechanism.

18. The combination of a frame, a toothed actuating wheel, a lever, a trigger arranged to encounter and be operated by a plant, means controlled by the trigger for putting the lever into engagement with the wheel, a transversely swinging hoe, means for swinging said hoe inwardly on movement of the lever with the wheel and for swinging the hoe outwardly on movement of the lever independently of the wheel, and means for automatically disengaging the lever from the wheel intermediate of the inward and outward movements of the hoe.

19. The combination of a frame, a toothed actuating wheel, a lever, a trigger arranged to encounter and be operated by a plant, means controlled by the trigger for putting the lever into engagement with the wheel, a transversely swinging hoe, means for swinging said hoe inwardly on movement of the lever with the wheel and for swinging the hoe outwardly on movement of the lever independently of the wheel, means for automatically disengaging the lever from the wheel intermediate of the inward and outward movements of the hoe, means for retracting the hoe by the wheel, said means automatically releasable from the wheel, and means for moving the hoe forwardly to its normal position.

20. The combination of a frame, a transversely swinging hoe, a toothed wheel, a lever, a trigger arranged to encounter and be actuated by a plant, means controlled by the trigger for engaging the lever with the wheel, a longitudinal rock-shaft connected with the hoe, a transversely swinging member for rocking said shaft in one direction, means for rocking the shaft in the opposite direction, a connection between said member and the lever, and means on the member for automatically disengaging the lever from the wheel at completion of the inward movement of the hoe.

21. The combination of a frame, a transversely swinging hoe, a toothed wheel, a lever, a trigger arranged to encounter and be actuated by a plant, means controlled by the trigger for engaging the lever with the wheel, a longitudinal rock-shaft connected with the hoe, a transversely swinging member for rocking said shaft in one direction, means for rocking the shaft in the opposite direction, a connection between said member and the lever, means on the member for automatically disengaging the lever from the wheel at the completion of the inward movement of the hoe, and means for resetting the trigger.

22. The combination of a frame, a transversely swinging hoe, a toothed wheel, a lever, a trigger arranged to encounter and be actuated by a plant, means controlled by the trigger for engaging the lever with the wheel, a longitudinal rock-shaft connected with the hoe, a transversely swinging member for rocking said shaft in one direction, means for rocking the shaft in the opposite direction, a connection between said member and the lever, means on the member for automatically disengaging the lever from the wheel at the completion of the inward movement of the hoe, means for resetting the trigger, means for moving the hoe yieldingly in one direction, and means for moving the hoe longitudinally in the opposite direction.

23. The combination of a frame, a transversely swinging hoe, a toothed wheel, a lever, a trigger arranged to encounter and be actuated by a plant, means controlled by the trigger for engaging the lever with the wheel, a longitudinal rock-shaft connected with the hoe, a transversely swinging member for rocking said shaft in one direction, means for rocking the shaft in the opposite direction, a connection between said member and the lever, means on the member for automatically disengaging the lever from the wheel at the completion of the inward movement of the hoe, means for resetting the trigger, means for moving the hoe longitudinally in one direction, and means for moving the hoe longitudinally in the opposite direction; the latter means comprising a lever connected with the hoe, means carried by said lever and movable into and out of engagement with the wheel, and means actuatable by said member for disengaging said means from the wheel.

24. The combination of a frame, a transversely swinging and fore and aft swinging hoe carried thereby; means for swinging said hoe inwardly and outwardly, said means comprising a rock-shaft having a crank arm, a rod interposed between the hoe and said arm and joined by ball and socket joints thereto, a cushioned stop carried by the frame and opposed to said arm, and means for engaging the arm and yieldingly holding the same against the cushioned stop.

25. The combination of an actuating toothed wheel, a lever movable into and out of engagement therewith, a trigger constructed and arranged to encounter and be operated by a plant, and mechanical means controlled by the trigger for moving the lever into engagement with the wheel.

26. The combination of an actuating toothed wheel, a lever movable into and out of engagement therewith, a trigger constructed and arranged to encounter and be operated by a plant, and electro-mechanical means controlled by the trigger for moving the lever into engagement with the wheel.

In testimony whereof I affix my signature.

CHARLES LALOR KENNEDY.